United States Patent [19]

Föhl

[11] Patent Number: 5,334,025

[45] Date of Patent: Aug. 2, 1994

[54] ELECTRICAL PLUG CONNECTION ON A PYROTECHNICAL GAS GENERATOR PROVIDED WITH AN ELECTRICAL IGNITER

[75] Inventor: Artur Föhl, Schorndorf, Fed. Rep. of Germany

[73] Assignee: TRW Repa GmbH, Alfdorf, Fed. Rep. of Germany

[21] Appl. No.: 987,255

[22] Filed: Dec. 7, 1992

[30] Foreign Application Priority Data

Dec. 10, 1991 [DE] Fed. Rep. of Germany ....... 4140692

[51] Int. Cl.$^5$ ........................................... H01R 29/00
[52] U.S. Cl. .................................... 439/188; 200/51.1
[58] Field of Search ............... 439/181, 182, 186, 187, 439/188; 200/51.09, 51.1, 51.11

[56] References Cited

U.S. PATENT DOCUMENTS

| | | | |
|---|---|---|---|
| 4,110,813 | 8/1978 | Hoheisel et al. | 102/28 R |
| 4,170,939 | 10/1979 | Hoheisel et al. | 200/51.1 |
| 4,358,135 | 11/1982 | Tsuge et al. | 200/51.1 |
| 4,420,216 | 12/1983 | Motoyama et al. | 439/188 |
| 4,628,818 | 12/1986 | Nilsson | 102/202.2 |
| 4,988,307 | 1/1991 | Muzslay | 439/188 |
| 5,054,395 | 10/1991 | Vetter et al. | 102/202.3 |
| 5,064,973 | 11/1991 | Zinn et al. | 200/51.1 |
| 5,142,982 | 9/1992 | Diepold et al. | 102/202.5 |

FOREIGN PATENT DOCUMENTS

| | | | |
|---|---|---|---|
| 1050131 | 3/1979 | Canada | 439/186 |
| 3909912 | 9/1990 | Fed. Rep. of Germany . | |
| 2331894 | 6/1977 | France . | |
| 2025711 | 1/1980 | United Kingdom | 439/188 |

OTHER PUBLICATIONS

Switching Connector; Perkins, N. K.; IBM Tech. Disclosure Bull., vol. 7, No. 6, Nov. 1964 p. 424.

*Primary Examiner*—P. W. Echols
*Attorney, Agent, or Firm*—Tarolli, Sundheim & Covell

[57] ABSTRACT

In an electrical plug connection on a pyrotechnical gas generator (10) provided with an electrical igniter for restraining systems in vehicles the two contact members (14, 16), one (14) of which is formed as a contact spring, engage each other as long as the plug connector (12) is not attached. The igniter is therefore safeguarded. On attachment of the plug connector the contact member (14) formed as a contact spring is spread radially away from the other contact member (16) so that the short-circuit between the contact members is removed. There is no longer any need to pay special attention to the safeguarding and removing of the safeguarding of the igniter.

6 Claims, 2 Drawing Sheets

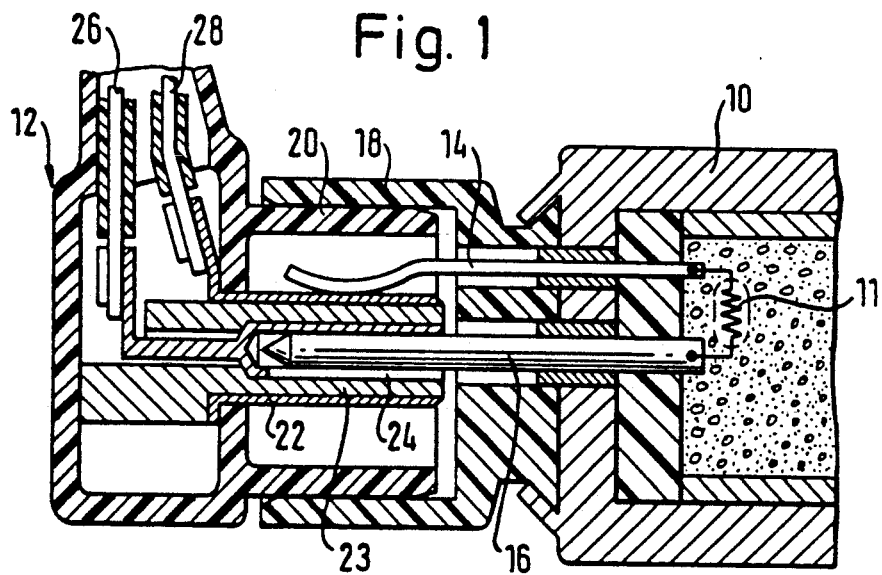
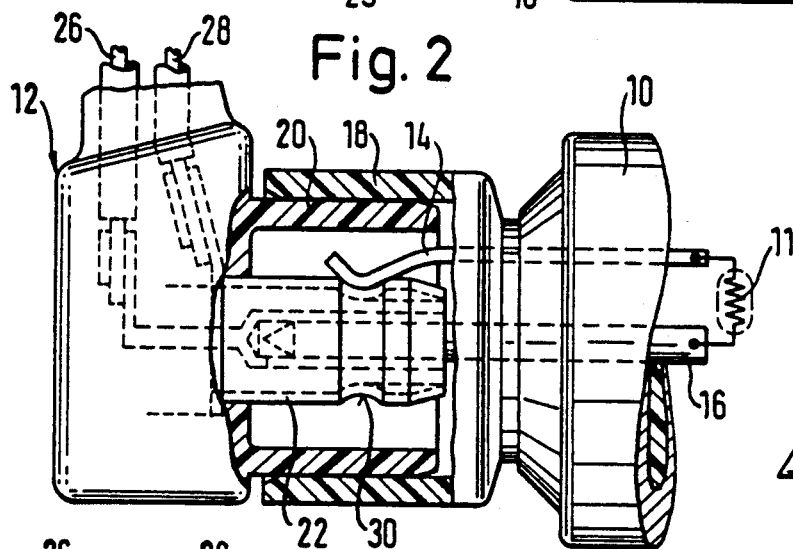
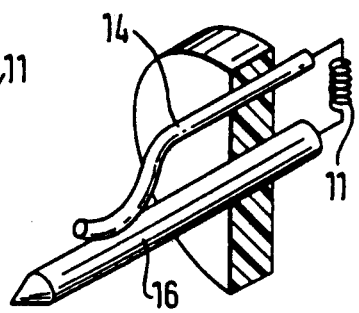
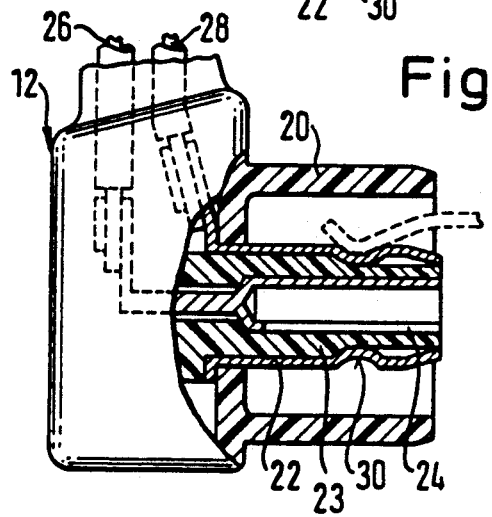
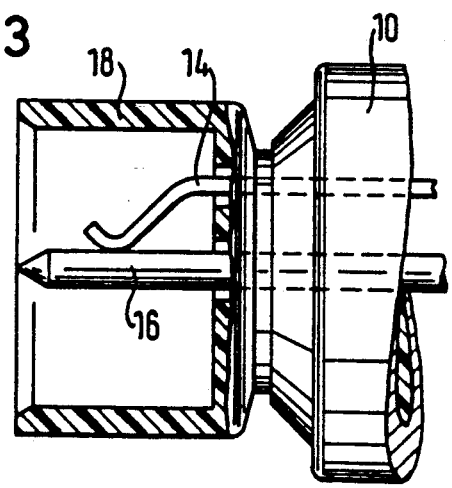

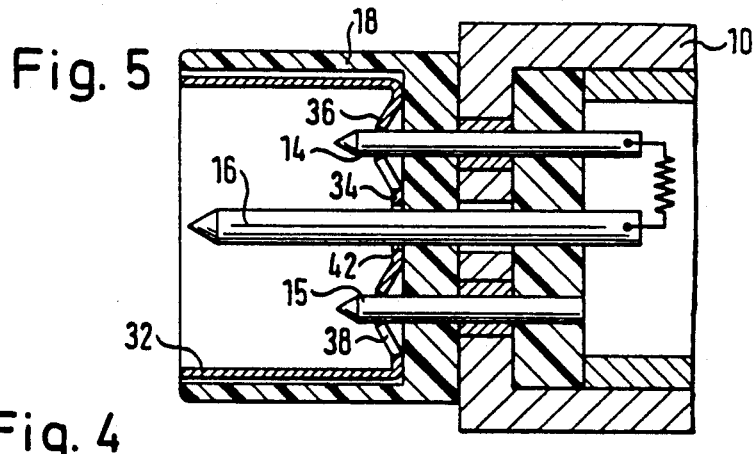
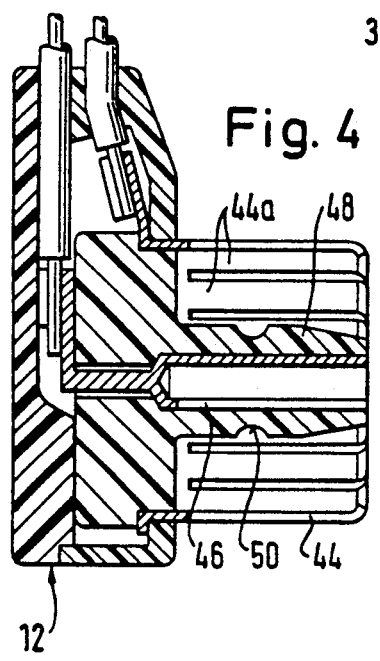
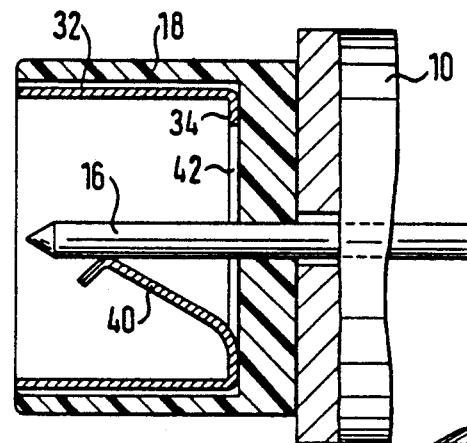
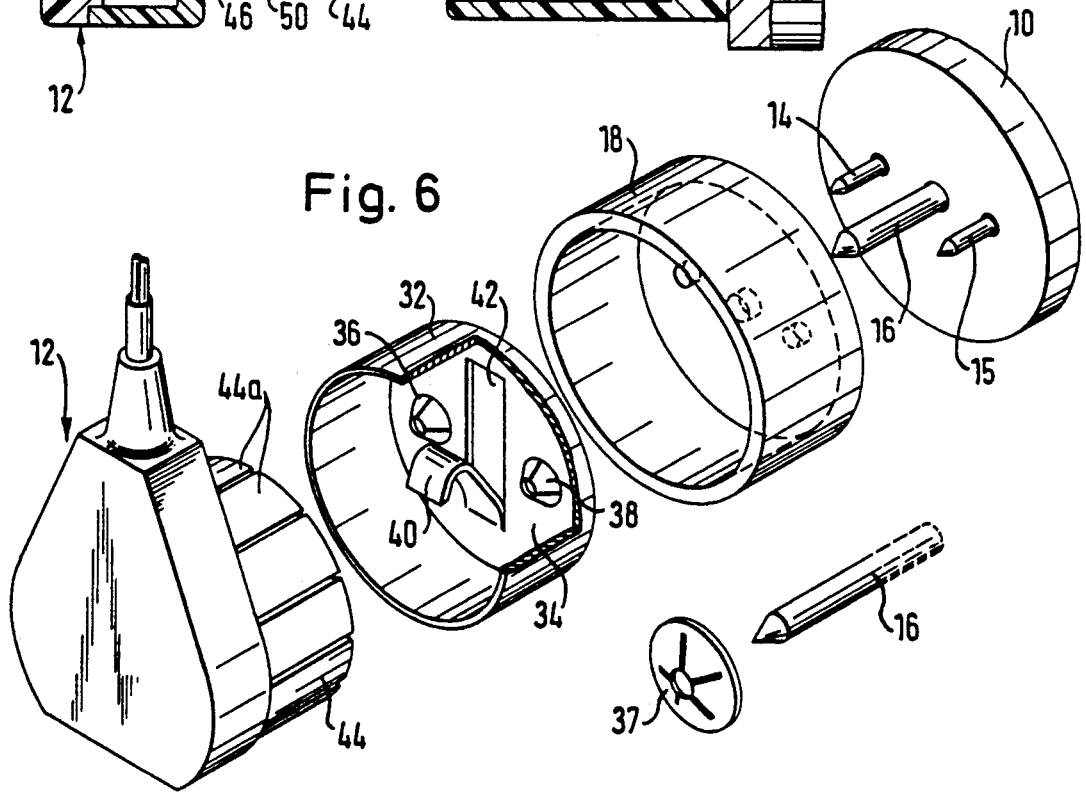

ELECTRICAL PLUG CONNECTION ON A PYROTECHNICAL GAS GENERATOR PROVIDED WITH AN ELECTRICAL IGNITER

BACKGROUND OF THE INVENTION

The present invention relates to an electrical plug connection on a pyrotechnical gas generator provided with an electrical igniter for restraining systems in vehicles.

A reliable measure of preventing unintentional firing of pyrotechnical gas generators equipped with an electrical igniter, it is expedient to provide the contact members of the igniter with a short-circuit bridge which is not rendered uneffective until the restraining system, for example a safety belt retractor with a pyrotechnical belt pretensioner or an airbag module, is installed in the vehicle. Such a short-circuit bridge is a separate component which electrically interconnects the contact members of the electrical igniter.

SUMMARY OF THE INVENTION

The invention proceeds from the recognition that safeguarding the igniter by means of a short-circuit bridge is not an optimum method. It is fundamentally not impossible for a gas generator to be delivered without a short-circuit bridge on its igniter or for the short-circuit bridge to be lost. The invention therefore proposes a configuration of the plug connection in which a bridging of the contact members of the igniter on the gas generator is ensured even without a separate short-circuit member for as long as the connector is not attached.

In accordance with the invention an electrical plug connection is provided which ensures that when the connector is not attached, a resilient part of the first contact member is in contact with the second contact member of the igniter and thus short-circuits the terminals of the electrical igniter. The connector is provided with a spreading member which, when the connector is attached, spreads the contact members radially away from each other. The resilient part of the first contact member bears against the second contact member under pretension until the plug connector is attached and engages beneath the resilient part to lift the latter off the second contact member. There is no need to pay any attention at all to the short-circuit bridge for the electrical igniter. The resulting gain in safety and simplified manipulation is achieved with simple means because only the plug connection required in any case need be appropriately constructed.

According to a first embodiment of the invention the spreading member is formed by an insulating bush which surrounds a contact sleeve complementary to the second contact member and is made tapered at its end facing the gas generator. The contact spring is bent over at its free end. With its tapered end, when the connector is pushed on, the insulating bush engages beneath the bent-over end of the contact spring and lifts the latter off the second contact member. It then holds said contact spring at a safe distance from the second contact member.

According to a second embodiment, the spreading member is formed by an outer contact sleeve which surrounds an insulating bush which in turn surrounds an inner contact sleeve which is arranged complementary to the second contact member formed as contact pin. In this embodiment the outer contact sleeve is brought into contact with the preferably bent-over end of the contact spring when the plug connector is pushed on; the resilient contact part is spread radially outwardly and due to its spring force remains in reliable engagement with the outer contact sleeve.

BRIEF DESCRIPTION OF THE DRAWINGS

Further features and advantages of the invention will be apparent from the following description and from the drawings, to which reference is made and in which:

FIG. 1 is a sectional view of a first embodiment of the plug connection with connector attached;

FIG. 1a is a perspective partial view of the plug connection with connector removed;

FIG. 2 is a schematic partial section of a further development of the embodiment of the plug connection shown in FIG. 1 with the connector attached;

FIG. 3 is a schematic partial view of the embodiment shown in FIG. 2 with the connector removed;

FIG. 4 is a schematic partial section of a further embodiment of the plug connection;

FIG. 5 is a sectional view, turned through 90° with respect to FIG. 4, of the end of the gas generator to be coupled to the connector; and FIG. 6 is an exploded view of the embodiment illustrated in FIGS. 4 and 5.

In FIG. 1, of the pyrotechnical gas generator 10 only the connection end is shown onto which a connector 12 is placed. The gas generator 10 is provided with an electrical igniter. The latter consists of a priming cap, the terminals of which are connected to two contact members 14, 16 which are insulated from each other and which are led out of the gas generator in axial direction. The contact member 16 is a contact pin coaxial with the cylindrical housing of the gas generator 10. The contact member 14 is constructed as contact spring or blade and made arcuate at its free end. A cylindrical plug base 18 is connected at its bottom to the end face of the gas generator 10 facing it. The ends of the contact members 14, 16 project into the interior of said plug base 18.

The connector 12 is provided with a plug socket member 20 which is insertable into the cylindrical interior of the plug base 18. The outer cylindrical contact sleeve 22 surrounds a tubular insulating body 23 which in turn surrounds an inner cylindrical coaxial contact sleeve 24. The inner contact sleeve 24 is made complementary to the end of the pin-like contact member 16. The outer contact sleeve 22 is intended for cooperation with the arcuately formed end of the contact member 14. The contact sleeves 22, 24 are connected to leads 26, 28 which are led out of the connector 12 at right-angles to the axis of the plug connection.

As long as the connector 12 is not pushed onto the connection end of the gas generator 10, the arcuately formed end of the contact member 14 engages the contact member 16 as illustrated in FIG. 1a. The contact members 14, 16 are therefore electrically short-circuited so that the priming cap 11 is safeguarded.

When the connector 12 is introduced with the plug socket member 20 into the plug base 18 firstly the inner contact sleeve 24 engages over the free end of the contact member 16 and then the outer contact sleeve 22 engages with its end face beneath the bent-over end of the contact member 14; on further pushing-on of the connector 12 the bent-over end of the contact member 14 is spread away from the contact member 16 in the radial direction and thereby comes into electrical contact engagement with the outer contact sleeve 22. The short circuit between the contact members 14, 16 is now cancelled.

In the further development of the plug connection shown in FIG. 2 the outer contact sleeve 22 is provided with an encircling peripheral groove 30 into which the free end of the contact member 14 bent complementary thereto can engage to secure the connector 12 axially to the plug base 18. The embodiment according to FIG. 2 otherwise corresponds to that according to FIG. 1.

FIG. 3 shows the embodiment of FIG. 2 again with the connector 12 removed.

In the embodiment according to FIGS. 4 to 6 both contact members 14, 16 are made in pin form. In addition, a securing pin 15 projects parallel to the contact members 14, 16 out of the end face of the gas generator 10 into the interior of the plug base 18. Into the cylindrical interior of the plug base 18 a cylindrical contact bush 32 is inserted, in the radial bottom 34 of which two outer passage openings are formed for the securing pin 15 and the contact member 14. To form said passage openings, the peripheral region at the bottom 34 is arched upwardly and slit so that spreading spring members result which ensure a firm fit of the outer contact bush 32 on the free ends of the contact member 14 and of the securing pin 15. At the same time, the plug base 18 is secured to the connection end of the gas generator 10. The spreading spring members are denoted in FIG. 5 generally by 36, 38; as indicated in FIG. 6, separate spreading spring members 37 may also be employed.

If the demands on strength and contact reliability are stricter, the free ends of the contact member 14 and the securing pin 15 are additionally soldered to the contact bush 32.

A contact spring 40 is stamped out of the radial bottom 34 in the diametrical direction. Said contact spring 40 is bent over at its free end. The window 42 in the bottom 34 formed by stamping out the contact spring 40 forms a passage opening for the center contact member 16.

For as long as no connector is attached, the contact spring 40 is in contact with the outer periphery of the contact member 16 and the contact members 14, 16 are consequently short-circuited as shown in FIG. 4.

The connector 12 is provided with a cylindrical contact bush 44 which can be fittingly inserted into the outer contact bush 32. Resilient webs 44a are formed on the contact bush 44 by axial slits so that the contact bush 44 yields resiliently in the radial direction. A coaxial inner contact sleeve 46 is formed complementary to the end of the contact member 16. Said contact sleeve 46 is surrounded by an insulating bush 48 which is made tapered at its end facing the gas generator.

Said insulating bush 48 forms a spreading member, the rear end of which, when the connector 12 is attached to the gas generator 10 engages beneath the bent-over end of the contact spring 40 and spreads the latter away from the contact member 16 in the radial direction. On further pushing on of the connector 12 the bent-over end of the contact spring 40 comes into engagement with a peripheral groove 50 of the insulating bush 48 to secure the connector 12 axially in the plug base 18.

In both embodiments the electrical igniter of the gas generator is always safeguarded by short-circuiting of the contact members 14, 16 when the connector 12 is not attached. The safeguarding is automatically cancelled when the connector 12 is attached.

What is claimed is:

1. An electrical plug connection for connecting a pair of electrical conductors to an electrical igniter on a pyrotechnical gas generator, said electrical igniter comprising a socket and a first pair of contact members extending into said socket in an axial direction of said gas generator, a plug connector being provided for fitting engagement with said socket and comprising a second pair of contact members for cooperation with said first pair of contact members and each connected to one of said conductors, wherein said socket comprises a cylindrical female contact sleeve connected to one of said first pair of contact members and having an integrally formed resilient reed member biased onto contacting engagement with the other of said first pair of contact members to short-circuit said first pair of contact members when said plug connector is removed from said socket, and wherein said plug connector comprises a spreading member engaging between said first pair of contact members to prevent electrical contact between said first pair of contact members when said plug connector is in fitting engagement with said socket, said spreading member being formed by an insulating bush surrounding a contact sleeve forming one of said second pair of contact members, said bush having a tapered free end and said reed member having a bent free end.

2. The plug connection of claim 1, wherein said insulating bush is provided with a peripheral groove and said bent free end of said reed member is adapted to engage said peripheral groove.

3. The plug connection of claim 1, wherein said plug connector has a cylindrical male contact sleeve for fitting engagement in said female contact sleeve of said socket and forming the other of said second pair of contact members.

4. The plug connection of claim 1, wherein said female contact sleeve has a radial bottom and said reed member is stamped out of said bottom.

5. The plug connection of claim 4, wherein a first one of said first pair of contact members is a contact pin extending coaxially with said female contact sleeve through an opening formed in said bottom by stamping out of said reed member and a second one of said first pair of contact members is a contact pin piercing an opening in said bottom.

6. The plug connection of claim 1, wherein at least one securing pin extends into said socket and is forced through an opening in said bottom.

* * * * *